United States Patent
Peters et al.

(10) Patent No.: US 9,835,418 B2
(45) Date of Patent: Dec. 5, 2017

(54) COMPOSITE MATERIALS AND APPLICATIONS THEREOF

(76) Inventors: James Carl Peters, Shelby, NC (US);
Steven John Morris, Shelby, NC (US);
Steven Joel Parks, Lexington, NC (US); Garry Duran Puckett, Shelby, NC (US); Peter Lawrence Votruba-Drzal, Pittsburgh, PA (US)

( * ) Notice: Subject to any disclaimer, the term of this patent is extended or adjusted under 35 U.S.C. 154(b) by 372 days.

(21) Appl. No.: 12/773,479

(22) Filed: May 4, 2010

(65) Prior Publication Data

US 2011/0027560 A1 Feb. 3, 2011

Related U.S. Application Data

(60) Provisional application No. 61/175,336, filed on May 4, 2009, provisional application No. 61/179,217, filed on May 18, 2009.

(51) Int. Cl.
*B32B 17/02* (2006.01)
*B32B 17/06* (2006.01)
*B32B 17/10* (2006.01)
*F41H 5/04* (2006.01)
*B32B 13/14* (2006.01)
(Continued)

(52) U.S. Cl.
CPC .......... *F41H 5/0435* (2013.01); *B32B 5/04* (2013.01); *B32B 5/12* (2013.01); *B32B 5/142* (2013.01); *B32B 7/005* (2013.01); *B32B 13/04* (2013.01); *B32B 13/12* (2013.01); *B32B 13/14* (2013.01); *Y10T 428/24967* (2015.01); *Y10T 442/30* (2015.04); *Y10T 442/3309* (2015.04)

(58) Field of Classification Search
CPC .................................. F41H 5/0414–5/0435
See application file for complete search history.

(56) References Cited

U.S. PATENT DOCUMENTS 4,116,886 A * 9/1978 Cella ............................... 528/88
4,159,361 A * 6/1979 Schupack ...................... 442/63
(Continued)

FOREIGN PATENT DOCUMENTS

CA 1123722 5/1982
EP 0 233 700 8/1987
(Continued)

OTHER PUBLICATIONS

ASM Handbook, vol. 21: Composites, (2001); pp. 27-34 and 59-68.*

(Continued)

*Primary Examiner* — Prashant J Khatri
(74) *Attorney, Agent, or Firm* — Kilpatrick Townsend & Stockton LLP

(57) ABSTRACT

Embodiments of the present invention relate to composite materials. In one embodiment, a composite material comprises an inorganic ceramic matrix comprising a first surface and a second surface opposite the first outer surface and generally parallel to the first outer surface. At least one open weave fiber glass fabric is disposed in the inorganic ceramic matrix between the first surface and the second surface. In another embodiment, a composite material comprises a first inorganic ceramic matrix comprising pieces of stone, a second inorganic ceramic matrix attached adjacent to the first inorganic ceramic matrix, and at least one open weave fiber glass fabric disposed in the second inorganic ceramic matrix.

15 Claims, 9 Drawing Sheets

(51) Int. Cl.
  *B32B 5/04* (2006.01)
  *B32B 5/14* (2006.01)
  *B32B 7/00* (2006.01)
  *B32B 13/04* (2006.01)
  *B32B 13/12* (2006.01)
  *B32B 5/12* (2006.01)

(56) References Cited

U.S. PATENT DOCUMENTS

| | | | |
|---|---|---|---|
| 4,680,203 A * | 7/1987 | Maki et al. | 427/393.6 |
| 4,739,690 A | 4/1988 | Moskowitz | |
| 4,813,334 A | 3/1989 | Bloks et al. | |
| 5,167,876 A | 12/1992 | Lem et al. | |
| 5,221,807 A | 6/1993 | Vives | |
| 6,003,278 A * | 12/1999 | Weaver | E04C 2/382 249/26 |
| 6,135,006 A | 10/2000 | Strasser et al. | |
| 6,176,920 B1 * | 1/2001 | Murphy et al. | 106/711 |
| 6,656,570 B1 | 12/2003 | Fels et al. | |
| 7,300,893 B2 | 11/2007 | Barsoum et al. | |
| 7,354,876 B2 | 4/2008 | Porter et al. | |
| 7,615,178 B2 | 11/2009 | Porter et al. | |
| 7,615,504 B2 | 11/2009 | Porter et al. | |
| 2003/0110932 A1 | 6/2003 | Mohr et al. | |
| 2004/0191580 A1 * | 9/2004 | Murk | C04B 28/06 428/702 |
| 2005/0009428 A1 * | 1/2005 | Porter et al. | 442/129 |
| 2006/0014457 A1 * | 1/2006 | Newton et al. | 442/218 |
| 2007/0068377 A1 | 3/2007 | Qiao et al. | |
| 2007/0111621 A1 | 5/2007 | Barsoum et al. | |
| 2007/0116939 A1 | 5/2007 | Benitsch et al. | |
| 2007/0166514 A1 | 7/2007 | Friedman et al. | |
| 2008/0011200 A1 | 1/2008 | Paul, Jr. | |
| 2008/0012169 A1 | 1/2008 | Solomon et al. | |
| 2008/0223203 A1 | 9/2008 | Ravid et al. | |
| 2008/0223204 A1 | 9/2008 | Genihovich et al. | |
| 2008/0264244 A1 | 10/2008 | Ravid et al. | |
| 2008/0307553 A1 | 12/2008 | Jbeili et al. | |

FOREIGN PATENT DOCUMENTS

| | | |
|---|---|---|
| EP | 0 287 918 | 10/1988 |
| EP | 0 500 250 | 8/1992 |
| EP | 1 538 417 | 6/2005 |
| GB | 2 336 595 | 10/1999 |
| GB | 2 444 389 | 6/2008 |
| JP | 53-137285 | 11/1978 |
| JP | 02-253940 | 10/1990 |
| JP | 04-334086 | 11/1992 |
| JP | 5 161 238 | 6/1993 |
| JP | 07-048822 | 2/1995 |
| JP | 11-500079 | 1/1999 |
| JP | 2002-501166 | 1/2002 |
| JP | 2005-171652 | 6/2005 |
| JP | 2006-344407 | 12/2006 |
| WO | WO 97/19226 | 5/1997 |
| WO | WO 2005/040711 | 5/2005 |
| WO | WO 2005/079207 | 9/2005 |
| WO | WO 2005/098343 | 10/2005 |
| WO | WO 2007/005043 | 1/2007 |
| WO | WO 2007/019959 | 2/2007 |
| WO | WO 2007/140626 | 12/2007 |
| WO | WO 2008/077605 | 7/2008 |
| WO | WO 2008/105889 | 9/2008 |
| WO | WO 2008/143662 | 11/2008 |
| WO | WO 2008/144892 | 12/2008 |
| WO | WO 2008/153613 | 12/2008 |

OTHER PUBLICATIONS

Kosmatka, S. "Properties and Performance of Normal-Strength and High-Strength Concrete". Concrete Construction Engineering Handbook, 2nd ed., (2008); pp. 5-1 to 5-46.*

Kosmatka, S. "Cement". Kirk-Othmer Encyclopedia of Chemical Technology, (2003); pp. 467-505.*

"Concrete Engineering". U.S. Army Engineer Center and School, (1992); pp. 1-1 to 4-38.*

"Iron and Steel Slag". USGS Mineral Information. Retrieved Sep. 19, 2012.*

Patent Cooperation Treaty, International Search Report, International Application PCT/US2010/033552, dated Feb. 23, 2011.

O'Neil III, E. et al., Development of Very-High-Strength and High-Performance Concrete Materials for Improvement of Barriers against Blast and Projectile Penetration, Selected Topics in Electronics and Systems, 2006, 42(Transformational Science and Technology for the Current and Future Force), pp. 203-210.

Zhang, J. et al., "Performance of Hybrid-Fiber ECC Blast/Shelter Panels Subjected to Drop Weight Impact," Journal of Material in Civil Engineering, 2007, 19(10), pp. 855-863.

Japanese Patent Office, Notice for Reasons of Rejection, Japanese Application No. 2012-508827, dated Jan. 28, 2014.

United States Patent and Trademark Office, Office Action, U.S. Appl. No. 13/803,344 dated May 20, 2014.

United States Patent and Trademark Office, Amendment and Response to Office Action, U.S. Appl. No. 13/803,344, filed Sep. 8, 2014.

* cited by examiner

COMPOSITE MATERIALS AND APPLICATIONS THEREOF

CROSS-REFERENCE TO RELATED APPLICATIONS

The present application hereby claims priority under 35 U.S.C. §119(e) to U.S. Provisional Patent Application Ser. No. 61/175,336 filed May 4, 2009, which is incorporated herein by reference, and to U.S. Provisional Patent Application Ser. No. 61/179,217 filed May 18, 2009, which is incorporated herein by reference.

FIELD OF THE INVENTION

The present invention relates to composite materials and, in particular, to composite materials for potential use in high energy impact applications such as with ballistics or blast resistance.

BACKGROUND OF THE INVENTION

Materials operable to withstand high energy impacts from various sources such as projectiles and blast compression waves find use in a wide range of applications, including civilian and military structural reinforcement applications. Blast deflection panels, for example, have been used to shield buildings and other structures of interest from potential damage caused by various explosive devices. Moreover, blast resistant construction materials have been incorporated into governmental and military buildings as a result of increased efforts to combat assaults on such structures. The Interagency Security Committee (ISC) of the United States General Services Administration (GSA), for example, has developed criteria to ensure that security considerations, including blast resistances, play an integral part in the planning, design and construction of federal office buildings and modernization projects.

Notwithstanding the importance of such materials in the construction and improvement of existing structures, there exists a need for a stronger, lighter weight, and more cost effective material. Significant disadvantages of current blast resistant materials are the associated high structural weights and thicknesses necessary to achieve acceptable blast resistance ratings. For example, conventional materials used for reinforcement include concrete panels that have been moderately to heavily reinforced with structural backup, such as tubes or channels. As a result of increased weights and thicknesses and the need for heavy structural reinforcements, many blast resistant materials can be difficult to effectively or efficiently incorporate into new or existing structures.

SUMMARY

In one aspect, the present invention relates to composite materials. In some embodiments, the composite materials are blast resistant and/or resistant to ballistics. In some embodiments, a composite material of the present invention comprises an inorganic ceramic matrix comprising a first outer surface and a second outer surface opposite the first outer surface; and at least one open weave fiber glass fabric disposed in the inorganic ceramic matrix between the first outer surface and the second outer surface. In some embodiments, the composite material further comprises a protection layer that is coupled to the second outer layer of the inorganic ceramic matrix. In other embodiments, the composite material further comprises a woven fiber glass fabric that is coupled to the first outer surface of the inorganic ceramic matrix. In yet other embodiments, the composite material comprises at least three open weave fiber glass fabrics disposed in the matrix between the first outer layer and the second outer layer. In some embodiments, the open weave fiber glass fabrics are spaced evenly throughout the inorganic ceramic matrix. The first and/or second glass fiber fabrics, in some embodiments, are open weave glass fiber fabrics, such as leno-grid or looper-grid woven glass fiber fabrics. In some embodiments, the fiber glass fabrics may be partially coated with a polymer.

In some embodiments, a composite material of the present invention comprises a first inorganic ceramic matrix containing pieces of stone, such as granite, and a second inorganic ceramic matrix adjacent to the first inorganic ceramic matrix which contains at least one woven or open weave glass fiber fabrics disposed in the second inorganic matrix. In some embodiments, the composite material further comprises a protection layer that is coupled to the second inorganic matrix. In other embodiments, composite material may comprise a first inorganic ceramic matrix that may be at least about 0.5 inches thick and the second inorganic ceramic matrix is at least about 0.5 inches thick. In other embodiments, the composite material may comprise a first inorganic ceramic matrix and a second inorganic ceramic matrix that are each at least about one inch thick. In still other embodiments the first and second inorganic ceramic matrices may be at least about two inches thick. In yet other embodiments, the first inorganic ceramic matrix may comprise up to 40% by volume of stone. In alternate embodiments, the first ceramic matrix may comprise up to 50% by volume of stone. In some embodiments the first inorganic ceramic matrix may comprise up to about 40% by volume of sand. In other embodiments, the first inorganic ceramic matrix may comprise up to about 50% by volume of sand.

In some embodiments a composite material may be a panel having a length and width that are substantially larger than its thickness. In other embodiments the panel may have a length of at least 7 feet. In other embodiments, the panel may have a length of at least 13 feet. In still other embodiments, a panel may comprise four surfaces representing the thickness of the panel with one or more of the surfaces being configured as a portion of a tapered lap joint to facilitate assembly of multiple panels. Thus, in some embodiments, the panels may be configured such that two or more panels can be coupled using tapered lap-joints. In some embodiments, enough panels can be coupled together via tapered lap joints to form a wall.

Another aspect of the present invention provides a method of making a composite material comprising a first inorganic ceramic matrix comprising a first outer surface and a second outer surface opposite a first outer surface and generally parallel to the first outer surface; and further comprising at least one open weave fiber glass fabric disposed in the inorganic ceramic matrix between the first outer surface and the second outer surface. In other embodiments, a composite material may be formed with a metal frame that surrounds an inorganic ceramic matrix with a first outer surface and a second outer surface opposite a first outer surface and generally parallel to the first outer surface; and further comprising at least one open weave fiber glass fabric disposed in the inorganic ceramic matrix between the first outer surface and the second outer surface. In other embodiments, a method is provided for the formation of a ceramic matrix comprising a first inorganic ceramic matrix comprising pieces of stone and sand and a second inorganic ceramic matrix containing at least one open weave fiber glass fabric dispersed within the second inorganic ceramic matrix wherein the composite material is cast within a metal frame that surrounds the inorganic ceramic matrix. In other embodiments the metal frame may be a steel frame. In yet other embodiments, one or more anchors may be used to further secure the composite material within the frame. In some embodiments, the anchor may comprise a bolt.

In some embodiments, a composite material of the present invention comprises a plurality of studs, a deposition layer coupled to the plurality of studs and an inorganic ceramic matrix contacting the deposition layer and comprising at least one woven glass fiber reinforcement disposed therein. In some embodiments, the at least one woven glass fiber reinforcement is an open weave glass fiber fabric, such as a leno-grid or looper-grid woven glass fiber fabric.

In some embodiments, an additional layer of spall resistant material may be attached to a face of the inorganic ceramic matrix. In yet other embodiments, a spall resistant material may be attached to the inorganic ceramic matrix via an epoxy. In still other embodiments, a spall resistant material may be sprayed onto said inorganic ceramic matrix. In yet other embodiments, a spall resistant material may comprise Mil-Tough®.

Composite materials of the present invention can be constructed into panels or other objects having any desired dimension(s). In some embodiments, the dimensions of the composite materials can be selected to provide resistance to Department of Defense minimum and GSA medium and/or high protection level blast loadings per UFC and ISC requirements. As used herein, "UFC protection level standards" means the U.S. Department of Defense Minimum Antiterrorism Standards for Buildings, Unified Facilities Criteria (UFC) 4-010-01, October 2003, which is hereby incorporated by reference. As used herein, "ISC standard" means the ISC Security Design Criteria for New Federal Office Buildings and Major Modernization Projects, The Interagency Security Committee, U.S. General Services Administration, 2001, which is hereby incorporated by reference. In other embodiments, the dimensions of the composite materials can be selected to provide ballistics protection as measured by the U.S. Department of Defense Test Method Standard for $V_{50}$ Ballistic Test for Armor, MIL-STD-662F, December 1997 (also referred to herein as "MIL-STD-662F"), which is incorporated herein by reference. In some embodiments, the composite material may be constructed into panels do not require machinery for assembly. In some embodiments, the composite material can be constructed into panels that may be carried by two people.

In some embodiments, the composite material may be constructed into panels for use in the construction of new structures. In alternate embodiments, the composite material may be constructed into panels for use in the construction of portable structures. In other embodiments, the composite material may be constructed into panels that may be used to retrofit existing structures.

In other embodiments, the composite material may be constructed into panels with a tapered lap joint arrangement such that the panels may fit together into a larger structure. In still other embodiments, the composite material may be constructed into panels that are up to eight feet in length. In some embodiments, the panels may extend up to fourteen feet in length. In some embodiment, the panels may be up to 1.5 inches in thickness. In yet other embodiments, the panel may be up to 3.5 inches in thickness. In still other embodiments, the panel may be at least 7 feet in length. In other embodiments, the panel may be at least 13 feet in length.

In other embodiments, the composite material may be constructed into a blast protection device having a first wall comprised of an inorganic ceramic matrix containing pieces of stone and sand and a second wall comprised of an inorganic ceramic matrix containing at least one open weave fiber glass fabric dispersed within the inorganic ceramic matrix wherein the first wall and second wall are separated in distance by six inches. In other embodiments, a blast protection device may further comprise a frame within which the first wall and the second wall are retained at a distance from each other of six inches.

In one aspect, the present invention provides methods of making ballistics resistant composite materials. In one embodiment, a method of making a ballistics resistant composite material comprises providing a first inorganic ceramic matrix containing pieces of stone, such as granite, dispersed randomly throughout and a second inorganic matrix, which is adhered to the first inorganic ceramic matrix, the second inorganic ceramic matrix comprising a plurality of woven or open weave glass fiber fabrics dispersed at even intervals throughout the inorganic matrix. In some embodiments, the ballistics resistant composite material may comprise an inorganic ceramic matrix containing a plurality of granite dispersed throughout the inorganic ceramic matrix. In other embodiments, a spall resistant compound, such as Mil-Tough® may be sprayed or adhered to the inorganic ceramic matrix via an epoxy to prevent delamination.

In another aspect, the present invention provides methods of making blast resistant composite materials. In one embodiment, a method of making a blast resistant composite material comprises providing an inorganic ceramic matrix having a first surface in facing opposition to a second surface and disposing a plurality of woven glass fiber reinforcements in the ceramic matrix. In some embodiments, a first woven glass fiber fabric is disposed proximate the first surface of the ceramic matrix, a second woven glass fiber fabric is disposed proximate the second surface of the ceramic matrix and at least one additional woven glass fiber fabric is disposed between the first and second fabrics, wherein the at least one additional fabric has a porosity lower than the first fabric and/or the second fabric. A plurality of additional woven glass fiber fabrics, in some embodiments, can be disposed between the first and second fabrics. In alternate embodiments, a plurality of woven or open weave glass fiber fabrics are disposed at regular intervals throughout the inorganic ceramic matrix.

In another embodiment, a method of making a blast resistance composite material comprises providing a plurality of studs, coupling a deposition layer to the plurality of studs and depositing an inorganic ceramic matrix on the deposition layer, the ceramic matrix comprising at least one woven glass fiber reinforcement disposed therein.

In some embodiments, a method of making a composite material of the present invention comprises providing a first inorganic ceramic matrix containing pieces of stone, such as granite, dispersed randomly throughout and a second inorganic ceramic matrix, which is adhered to a first inorganic ceramic matrix, the second inorganic ceramic matrix comprising a plurality of woven or open weave glass fiber fabrics dispersed at even intervals throughout the inorganic ceramic matrix. In some embodiments, the composite material may comprise an inorganic ceramic matrix containing a plurality of granite dispersed throughout the inorganic ceramic matrix.

In another embodiment, a composite material of the present invention may be made into a blast or ballistics resistant wall structure. In further embodiments, a wall structure according to the present invention may comprise a first inorganic ceramic matrix containing chunks of granite fixed to a second layer of an inorganic ceramic matrix with a plurality of woven glass fiber fabric interspersed throughout. In an embodiment, the first and second layers are separated from a third inorganic ceramic matrix containing a plurality of woven glass fiber fabric that is fixedly attached to a layer to reduce spall by a gap. In some embodiments, the gap is at least six inches.

In various embodiments utilizing an inorganic ceramic matrix, the inorganic ceramic matrix, in some embodiments, can comprise a phosphate ceramic matrix.

These and other embodiments of the present invention are described in greater detail in the detailed description which follows.

DETAILED DESCRIPTION

Figure 1A:
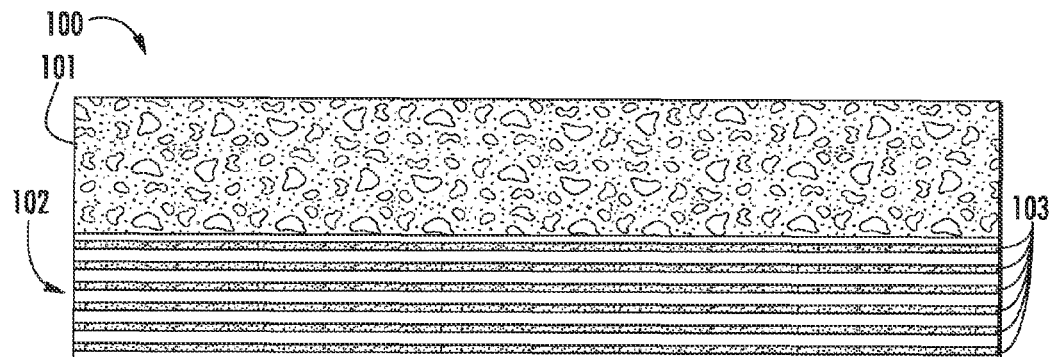
FIG. 1A-C illustrates cross-sectional views of composite materials according to one embodiment of the present invention. The sizes of the layers and distances between the layers shown in FIG. 1 are for illustrative purposes.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub ranges subsumed therein. For example, a stated range of "1 to 10" should be considered to include any and all sub ranges between (and inclusive of) the minimum value of 1 and the maximum value of 10; that is, all sub ranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Various embodiments of the present invention provide composite materials and methods of making the same. In some embodiments, the composite materials comprise blast resistant composite materials and methods of making blast resistant composite materials. In some embodiments, blast resistant composite materials of the present invention can be fabricated into panels and other objects for the reinforcement of buildings and various structures. In some embodiments, composite materials of the present invention can provide ballistics protection (e.g., protection from bullets). In alternate embodiments, composite materials of the present invention can provide blast resistance protection (e.g., protection from explosive devices). Composite materials of the present invention, in some embodiments, can provide both blast resistance and ballistics protection. In additional embodiments, composite materials of the present invention may provide resistance to extreme temperatures or fires.

In some embodiments, the composite materials are blast resistant and/or resistant to ballistics. In some embodiments, a composite material of the present invention comprises an inorganic ceramic matrix comprising a first outer surface and a second outer surface opposite the first outer surface; and at least one open weave fiber glass fabric disposed in the inorganic ceramic matrix between the first outer surface and the second outer surface. In some embodiments, the composite material may further comprise a protection layer that is coupled to the second outer layer of the inorganic ceramic matrix. In other embodiments, the composite material further comprises a woven fiber glass fabric that is coupled to the first outer surface of the inorganic ceramic matrix. In other embodiments the composite material further comprises an open weave fiber glass fabric that is disposed at the first outer surface of the inorganic ceramic matrix, a surface fabric. In some embodiments the surface fabric provides greater resistance to damage from ballistics. In yet other embodiments, the composite material comprises at least three open weave fiber glass fabrics disposed in the matrix between the first outer layer and the second outer layer. In some embodiments, the open weave fiber glass fabrics are spaced evenly throughout the inorganic ceramic matrix. The first and/or second glass fiber fabrics, in some embodiments, are open weave glass fiber fabrics, such as leno-grid or looper-grid woven glass fiber fabrics. In some embodiments, the fiber glass fabrics may be partially coated with a polymer.

An open weave fiber glass fabric may comprise a fabric that is comprised of a fiber glass grid of varying weight depending on the desired application. In some embodiments, the fiber glass fabric may be comprised of a fiber glass that is at least about 9 ounces per square yard in weight. In other embodiments, the fiber glass fabric may be comprised of a fiber glass fabric that is at least about 25 ounces per square yard in weight. In a preferred embodiment, the fiber glass fabric may be comprised of a fiber glass that is at least about 14 ounces per square yard in weight. In yet other embodiments the fiber glass fabric may be coated with a polymer. The polymer, for example, can assist in holding the fabric together, making the fabric more rigid, and/or facilitating construction of a composite material of the present invention. Such polymers can include thermoplastic or thermoset polymers. One example of such a polymer is an acrylic polymer.

In some embodiments, the fiber glass fabrics may comprise a void area in the pattern of the open weave that is large enough such that the inorganic ceramic matrix may contact itself through the void in the weave pattern. In some embodiments, the void opening may be at least 0.25 inches. In other embodiments, the void opening may be up to one inch.

In some embodiments, a composite material may comprise an inorganic ceramic matrix comprising a first outer surface and an open weave fiber glass fabric disposed at the first outer surface and a second outer surface opposite the first outer surface with a second open weave glass fiber fabric disposed at the second outer surface with at least one open weave fiber glass fabric disposed between the first outer surface and the second outer surface within the inorganic ceramic matrix. In other embodiments the composite material further comprises an open weave fiber glass fabric that is disposed at the first outer surface of the inorganic ceramic matrix, a surface fabric. In some embodiments the surface fabric provides greater resistance to damage from ballistics. In other embodiments, the composite material may be at least about 1.5 inches in thickness and further comprise at least about four open weave fiber glass fabrics dispersed at equal intervals of about 0.5 inches throughout the inorganic ceramic matrix. In yet other embodiments, the composite material may be at least about 3.5 inches in thickness and further comprise at least about six open weave glass fiber fabrics disposed within the inorganic ceramic matrix at equal intervals of about 0.7 inches.

In other embodiments, a composite material may further comprise a protection layer that is coupled to the second outer surface of the inorganic ceramic matrix. The protection layer may comprise a spall-resistant material that prevents the deterioration or spalling of the inorganic ceramic matrix through exposure to moisture or extreme heat or pressure. Spall occurs when pieces or chunks of concrete separate and break off from the larger concrete structure. Spalling may occur when the concrete is exposed to excessive moisture, temperature or pressure. For example, a fire inside of a concrete structure may cause spalling of the concrete due to extreme temperatures. In some embodiments the protection layer is sprayed onto the second outer surface of the inorganic ceramic matrix. In other embodiments the protection layer is coupled to the second outer surface by an epoxy. In some embodiments the epoxy may comprise a water cured epoxy. In other embodiments the protection layer may be Mil-Tough™.

In other embodiments, a composite material comprising an inorganic ceramic matrix having a first outer surface and a second outer surface opposite a first outer surface and at least one open weave glass fiber fabric disposed between the first outer surface and the second outer surface may also comprise a metal reinforcement. In some embodiments the metal reinforcement may comprise a fine mesh screen. In other embodiments the metal reinforcement may provide electrical conductivity or magnetic properties to the composite material.

In some embodiments, a composite material of the present invention comprises a first inorganic ceramic matrix containing pieces of stone, such as granite, and a second inorganic ceramic matrix adjacent to the first inorganic ceramic matrix which contains at least one woven or open weave glass fiber fabrics disposed in the second inorganic matrix. In other embodiments, the composite material further comprises a protection layer that is coupled to the second inorganic matrix. In some embodiments, composite material may comprise a first inorganic ceramic matrix that contains pieces of stone, such as granite. In some embodiments, the second inorganic matrix may comprise at least one open weave glass fiber fabric and sand. In other embodiments, the sand may further comprise granite sand. In some embodiments, granite sand may improve the compressive qualities of the composite material.

In some embodiments, the first inorganic ceramic matrix may comprise pieces of granite in varying sizes. In some embodiments the pieces of granite may be at least about 0.75 inches in diameter. In other embodiments the pieces of granite may be less than 0.75 inches in diameter but more than 0.25 inches in diameter. In other embodiments, the granite provided may be 6 M in size and shape. In yet other embodiments, the first inorganic ceramic matrix may comprise up to 40% by volume of stone. In alternate embodiments, the first ceramic matrix may comprise up to 50% by volume of stone. In some embodiments the second inorganic ceramic matrix may comprise up to about 40% by volume of sand. In other embodiments, the second inorganic ceramic matrix may comprise up to about 50% by volume of sand.

In some embodiments, the composite material may be comprised of a first inorganic ceramic matrix that is at least about one inch thick and a second inorganic ceramic matrix that is at least about one inch thick. In other embodiments, a second inorganic matrix that is at least about one inch thick may contain at least six open weave fiber glass fabrics dispersed evenly throughout. In other embodiments the first inorganic matrix may further comprises an open weave fiber glass fabric that is disposed at the first outer surface of the inorganic ceramic matrix, a surface fabric. In some embodiments the surface fabric provides greater resistance to damage from ballistics. In other embodiments, the composite material may comprise a first inorganic ceramic matrix and a second inorganic ceramic matrix that are each at least about 1.5 inches thick. In an embodiment in which a second inorganic ceramic matrix is at least about 1.5 inches thick, the second inorganic ceramic matrix may comprise at least about nine open weave fiber glass fabrics dispersed evenly throughout. In other embodiments the first inorganic matrix may further comprises an open weave fiber glass fabric that is disposed at the first outer surface of the inorganic ceramic matrix, a surface fabric. In some embodiments the surface fabric provides greater resistance to damage from ballistics. In still other embodiments both the first and second inorganic ceramic matrices may each be at least about two inches thick. In an embodiment in which a second inorganic ceramic matrix is at least about two inches thick, the second inorganic ceramic matrix may comprise at least about twelve open weave fiber glass fabrics dispersed evenly throughout. In other embodiments the first inorganic matrix may further comprises an open weave fiber glass fabric that is disposed at the first outer surface of the inorganic ceramic matrix, a surface fabric. In some embodiments the surface fabric provides greater resistance to damage from ballistics.

In some embodiments the total thickness of the composite material comprising a first inorganic ceramic matrix comprising pieces of stone and a second inorganic matrix comprising at least one open weave fiber glass fabric and sand may be 2 inches. In other embodiments, the total thickness of the composite material with a first inorganic matrix and a second inorganic matrix may be 3 inches. In yet other embodiments, the total thickness may be 4 inches.

In yet other embodiments, a composite material comprising a first inorganic ceramic matrix containing pieces of stone and a second inorganic ceramic matrix comprising at least one open weave fiber glass fabric and sand may further comprise a protection layer that is coupled to the second inorganic ceramic matrix The protection layer may comprise a spall-resistant material that prevents the deterioration or spalling of the inorganic ceramic matrix through exposure to moisture or extreme heat or pressure. In some embodiments the protection layer is sprayed onto the second outer surface of the inorganic ceramic matrix. In other embodiments the protection layer is coupled to the second outer surface by an epoxy. In some embodiments the epoxy may comprise a water cured epoxy. In other embodiments the protection layer may be Mil-Tough™.

In other embodiments a composite material may be a panel having a length and width that are substantially larger than its thickness. In other embodiments the panel may have a length of at least 7 feet. In other embodiments, the panel may have a length of at least 13 feet. In still other embodiments, a panel may comprise four surfaces representing the thickness of the panel with one or more of the surfaces being configured as a portion of a tapered lap joint to facilitate assembly of multiple panels. Thus, in some embodiments, the panels may be configured such that two or more panels can be coupled using tapered lap-joints. In some embodiments, enough panels can be coupled together via tapered lap joints to form a wall.

Another aspect of the present invention provides a method of making a composite material comprising a first inorganic ceramic matrix comprising a first outer surface and a second outer surface opposite a first outer surface and generally parallel to the first outer surface; and further comprising at least one open weave fiber glass fabric disposed in the inorganic ceramic matrix between the first outer surface and the second outer surface. In other embodiments, a composite material may be formed with a metal frame that surrounds an inorganic ceramic matrix with a first outer surface and a second outer surface opposite a first outer surface and generally parallel to the first outer surface; and further comprising at least one open weave fiber glass fabric disposed in the inorganic ceramic matrix between the first outer surface and the second outer surface. In other embodiments, a method is provided for the formation of a ceramic matrix comprising a first inorganic ceramic matrix comprising pieces of stone and sand and a second inorganic ceramic matrix containing at least one open weave fiber glass fabric dispersed within the second inorganic ceramic matrix wherein the composite material is cast within a metal frame that surrounds the inorganic ceramic matrix. In other embodiments the metal frame may be a steel frame. In yet other embodiments, one or more anchors may be used to further secure the composite material within the frame. In some embodiments, the anchor may comprise a bolt or another protrusion extending from the interior frame wall. When the inorganic ceramic matrix is added to the frame, the matrix can surround the anchor and help secure the frame to the matrix after it cures.

In another embodiment, a composite material of the present invention may be made into a blast and/or ballistics resistant wall structure. In further embodiments, a wall structure according to the present invention may comprise a first inorganic ceramic matrix containing chunks of granite fixed to a second layer of an inorganic ceramic matrix with a plurality of woven glass fiber fabric interspersed throughout. In an embodiment, the first and second layers are separated from a third inorganic ceramic matrix containing a plurality of woven glass fiber fabric that is fixedly attached to a layer to reduce spall by a gap. In some embodiments, the gap is at least six inches.

In some embodiments, a composite material of the present invention comprises a plurality of studs, a deposition layer coupled to the plurality of studs and an inorganic ceramic matrix contacting the deposition layer and comprising at least one woven glass fiber fabric disposed therein. In some embodiments, the at least one woven glass fiber fabric is an open weave glass fiber fabric, such as a leno-grid or looper-grid woven glass fiber fabric. In some embodiments the woven glass fiber fabric may have an open weave pattern such that the inorganic ceramic matrix may contact itself through the openings in the weave pattern. In some embodiments, the woven glass fiber fabric disposed between the first and second woven fabrics may have a tight weave pattern that does not allow the inorganic ceramic matrix to contact itself through the openings in the weave pattern. The tight weave fabric, in some embodiments, may be needled to enhance binding to the inorganic ceramic matrix. In some embodiments, a plurality of additional woven glass fiber fabrics are disposed between the first and second fabrics.

The first and/or second glass fiber fabrics, in some embodiments, can be leno-grid woven glass fiber fabrics. In other embodiments, the first and/or second glass fiber fabrics can be looper-grid woven glass fiber fabrics.

A number of factors can be considered in selecting fiber glass strands for use in making tightly woven or open weave fabrics for use in embodiments of the present invention including, for example, the desired weight per surface area of the fabric, tensile strength of the fabric, desired weave pattern, desired openness of the fabric, cost, and others. Similarly, one skilled in the art may choose one of many commercially available sizing compositions for the glass fibers based upon a number of factors including, for example, performance properties of the sizing compositions, desired flexibility of the resulting fabric, cost, and other factors. Additionally, in some embodiments, a particular weave pattern may be chosen based upon the desired amount of contact of the inorganic ceramic matrix between the gaps in the weave pattern. In some embodiments, a woven glass fiber fabric that is disposed between a first and second woven fabric disposed within a composite material comprising an inorganic ceramic matrix may be needled. In yet other embodiments, there may be a plurality of needled woven glass fiber fabrics disposed between the first and second woven fabrics. In some embodiments where the glass fiber fabrics disposed between the first and second woven fabrics are needled, needling can result in some fibers being oriented in a z-direction (e.g., not generally parallel to the fabric surface in the x-y plane) or perpendicular to the fabric surface. In such embodiments, the needled fibers can assist in holding the inorganic ceramic matrix to the fabric and help resist delamination of the fabric from the ceramic matrix. The fabrics can be needled using techniques known to those of ordinary skill in the art.

In yet other embodiments, the woven glass fiber fabrics that may be disposed proximate to the first and second surfaces within a composite material comprised of an inorganic ceramic matrix may comprise woven glass fiber fabrics that have been lightly coated with a polymer. The polymer, for example, can assist in holding the fabric together, making the fabric more rigid, and/or facilitating construction of a composite material of the present invention. Such polymers can include thermoplastic or thermoset polymers. One example of such a polymer is an acrylic polymer.

In some embodiments, the composite material may comprise a plurality of thinner or thicker woven glass fiber fabrics disposed within the inorganic ceramic matrix. In some embodiments, the composite material may comprise fewer, thicker woven glass fiber fabrics disposed within the inorganic ceramic matrix. In yet other embodiments, the composite material may comprise many, thinner woven glass fiber fabrics disposed throughout the inorganic ceramic matrix. The number and the thickness of the woven or open weave glass fiber fabrics that may be contained within a composite material according to the present invention may be selected based upon the desired characteristics of the composite material, including, but not limited to, desired properties of the composite material, the desired dimensions of the composite material, production costs, and other factors.

In some embodiments, a composite material of the present invention comprises an inorganic ceramic matrix having a first surface in facing opposition to a second surface and a plurality of woven glass fiber reinforcements disposed in the matrix between the first surface and the second surface. In some embodiments, a composite material comprises a first woven glass fiber fabric proximate the first surface of the inorganic ceramic matrix and a second woven glass fiber fabric proximate the second surface of the ceramic matrix and at least one additional woven glass fiber fabric disposed between the first and second woven fabrics wherein the at least one additional fabric has a lower porosity than the first fabric and/or the second fabric.

In some embodiments, the composite material may comprise a first inorganic ceramic matrix that comprises randomly dispersed pieces of stone, such as granite, throughout and a second inorganic ceramic matrix coupled to the first inorganic ceramic matrix, the second inorganic ceramic matrix comprising a plurality of woven or open weave glass fiber fabrics dispersed throughout at regular intervals.

In some embodiments the composite material may comprise a first inorganic ceramic matrix containing randomly dispersed, irregularly shaped pieces of stone, such as granite, attached to a second inorganic ceramic matrix, the second inorganic ceramic matrix comprising a plurality of glass fiber fabrics dispersed at regular intervals throughout the second inorganic ceramic matrix. The second inorganic ceramic matrix, in some embodiments, comprise a plurality of woven glass fiber fabrics and a single open weave glass fiber fabric dispersed evenly throughout the matrix. In some embodiments the woven glass fiber fabrics may be needled to enhance the binding with the inorganic ceramic matrix. In some embodiments, the second inorganic ceramic matrix may comprise a plurality of needled woven glass fiber fabrics dispersed at regular intervals throughout the inorganic ceramic matrix. In yet other embodiments, the second inorganic ceramic matrix may comprise a plurality of open weave glass fiber fabrics, such as looper-grid fabrics, dispersed at regular intervals throughout the inorganic ceramic matrix. The second inorganic ceramic matrix may, in certain embodiments, comprise a plurality of open weave glass fiber fabrics dispersed at regular intervals throughout the inorganic ceramic matrix and a single woven glass fiber fabric disposed at the edge of the inorganic ceramic matrix.

In still other embodiments, a composite material of the present invention may comprise a thicker or thinner first inorganic ceramic matrix containing randomly dispersed pieces of stone, such as granite, throughout and a thicker or thinner second inorganic ceramic matrix coupled to the first inorganic ceramic matrix that contains a plurality of woven or open weave glass fiber fabrics dispersed throughout at regular intervals. In certain embodiments the first inorganic ceramic matrix may be one inch in thickness and may be coupled to a second inorganic ceramic matrix that is also one inch in thickness and may contain up to six woven or open weave glass fiber fabrics dispersed throughout at regular intervals. The second inorganic ceramic matrix may also be coupled to layer of spall resistant material. In some embodiments, the spall resistant material may be coupled to the second inorganic matrix via an epoxy. In still other embodiments, the first inorganic ceramic matrix may be one and one half inches thick and may be coupled to a second inorganic ceramic matrix that is also one and one half inches thick and may comprise up to nine woven or open weave glass fiber fabrics dispersed throughout at regular intervals. The second inorganic matrix may also be coupled to a spall resistant material that may be coupled to the second inorganic matrix via an epoxy. In certain embodiments the spall resistant material may comprise Mil-Tough™, a polyurea coating commercially available from PPG Industries, Inc.

In some embodiments where the composite material comprises an inorganic ceramic matrix that includes randomly dispersed pieces of stone, the first inorganic ceramic matrix can be formed from, for example, Grancrete PCW, which is commercially available from Grancrete, Inc. In other embodiments, the stone may comprise granite. In yet other embodiments, the ratio of stone to Grancrete PCW may be 1:1. In some embodiments where the composite material comprises a second inorganic ceramic matrix that includes one or more glass fiber fabrics, the second inorganic ceramic matrix can be formed from, for example, two parts Grancrete PCW, which is commercially available from Grancrete, Inc., and one part sand. In yet other embodiments, the inorganic ceramic matrix may be formed from one part Grancrete and one part sand and contain a plurality of glass fiber fabrics dispersed throughout.

In some embodiments, at least one surface of the composite material may be sprayed with a polymer. For example, in some embodiments, the surface of the composite material that will face the interior of a structure can be sprayed with a polymer. The polymer, in some embodiments, can limit spall or help prevent loose chunks of the composite material from flying off the composite material when the composite material is impacted (either with a blast or ballistics). In some embodiments, a surface of the composite material can be coated with a polyurea. One example of an aliphatic polyurea that can be applied to some embodiments of composite materials is Mil-Tough™, which is commercially available from PPG Industries, Inc. In yet other embodiments, the aliphatic polyurea may be applied to a second inorganic matrix via an epoxy. In some embodiments, an epoxy may be moisture cured. In still other embodiments, the epoxy may comprise Mil-Tough™ "Spall Master" polyurea coating.

In an embodiment, a composite material of the present invention comprising an inorganic ceramic matrix having a first surface in facing opposition to a second surface and a plurality of woven glass fiber reinforcements disposed in the matrix between the first surface and the second surface may comprise a fire-resistant composite material. For example, in some embodiments, the fire-resistant composite material may provide heat resistance of up to and greater than 2000° F.

In some embodiments, a composite material of the present invention comprising an inorganic ceramic matrix having a first surface in facing opposition to a second surface and a plurality of woven glass fiber reinforcements disposed in the matrix between the first surface and the second surface may comprise a ballistics resistant composite material. In some embodiments, the ballistics resistant composite material may provide protection from the penetration of projectiles fired at the composite material. For example, in some embodiments, a composite material of the present invention may provide improved ballistics resistance as compared to an inorganic ceramic matrix, which does not contain glass fiber fabrics. In some embodiments, the composite material may provide 50% greater ballistics resistance compared to an inorganic ceramic matrix alone. In other embodiments, a composite material of the present invention may provide a total resistance to a ballistic threat as measured by MIL-STD-662F. In yet other embodiments, a composite material of the present invention may provide UL Level-8 Multi-Strike resistance to a ballistic threat.

In alternate embodiments, a composite material of the present invention comprising an inorganic ceramic matrix having a first surface in facing opposition to a second surface and a plurality of woven glass fiber reinforcements disposed in the matrix between the first surface and the second surface may comprise a blast resistant composite material. In some embodiments, the blast resistant composite material may provide blast resistance that exceeds the medium-level of protection standard of the UFC protection level standards. In some embodiments, the blast resistant composite material may provide blast resistance in excess of the intermediate-level of protection standard of the UFC protection level standards. For example, in some embodiments, a composite material of the present invention may exhibit no delamination or spall when a blast load of GSA medium level is applied. In other embodiments, a composite material according to the present invention may exhibit only minor cracking or delamination at a blast load of intermediate level according the protection level standards. In still other embodiments, a composite material comprising a one and one half inch first inorganic ceramic matrix layer and a one and one half inch second inorganic ceramic matrix layer may withstand a blast load of high level according to the protection level standards.

FIG. 1 illustrates a cross-sectional view of a ballistics resistant composite material according to one embodiment of the present invention. In the embodiment shown in FIG. 1, the composite material comprises a first inorganic ceramic matrix that includes pieces of stone that is one inch in thickness with an open weave glass fiber fabric positioned at the strike face of the first inorganic ceramic matrix and a second inorganic ceramic matrix comprising six open weave glass fiber fabrics and sand that is one inch in thickness and a protection layer that is coupled to the second inorganic ceramic matrix. As illustrated in FIG. 1, the composite material (100) comprises a first inorganic ceramic matrix (101) comprising pieces of stone and a second inorganic ceramic matrix (102) comprising at least one open weave glass fiber fabrics (103) and sand and a protection layer (104).

In some embodiments, the plurality of additional open weave fiber glass fabrics (103) can comprise any woven glass fiber fabric not inconsistent with the objectives of the present invention. In some embodiments, for example, each of the plurality of additional open weave fiber glass fabrics comprises an approximately 14 ounce per square yard E-glass looper-grid fabric. In some embodiments, one or more of the fabrics (103) can coated with a polymer.

Moreover, the first and second woven glass fiber fabrics can comprise any woven glass fiber fabric not inconsistent with the objectives of the present invention. In some embodiments, for example, the first and/or second woven glass fiber fabrics can comprise an approximately 9 ounce per square yard E-glass leno-grid fabric.

In some embodiments, the first and/or second woven glass fiber fabrics can comprise an approximately 25 ounce per square yard E-glass woven roving.

In some embodiments, the first and/or second woven glass fiber fabrics can be lightly coated with a polymer. The polymer, for example, can assist in holding the fabrics (103) together, making the fabrics more rigid, and/or facilitating construction of a composite material. Such polymers can include thermoplastic or thermoset polymers. One example of such a polymer is an acrylic polymer.

Figure 1B:
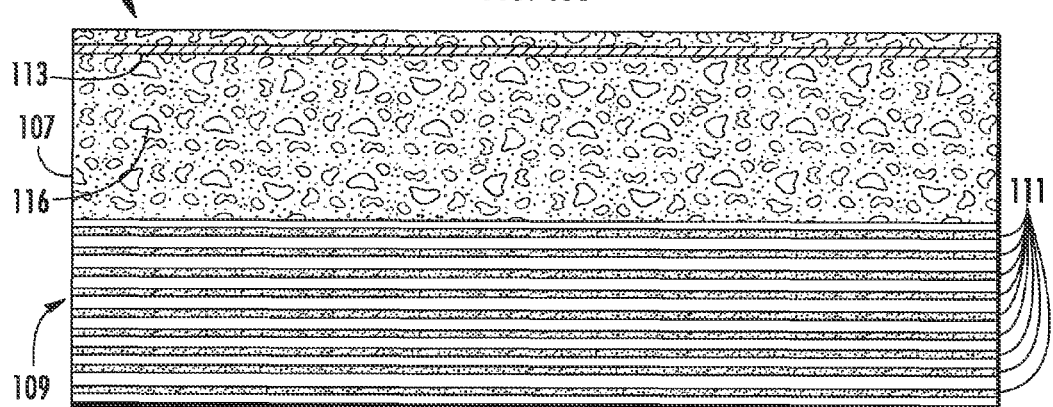
Figure 1C:
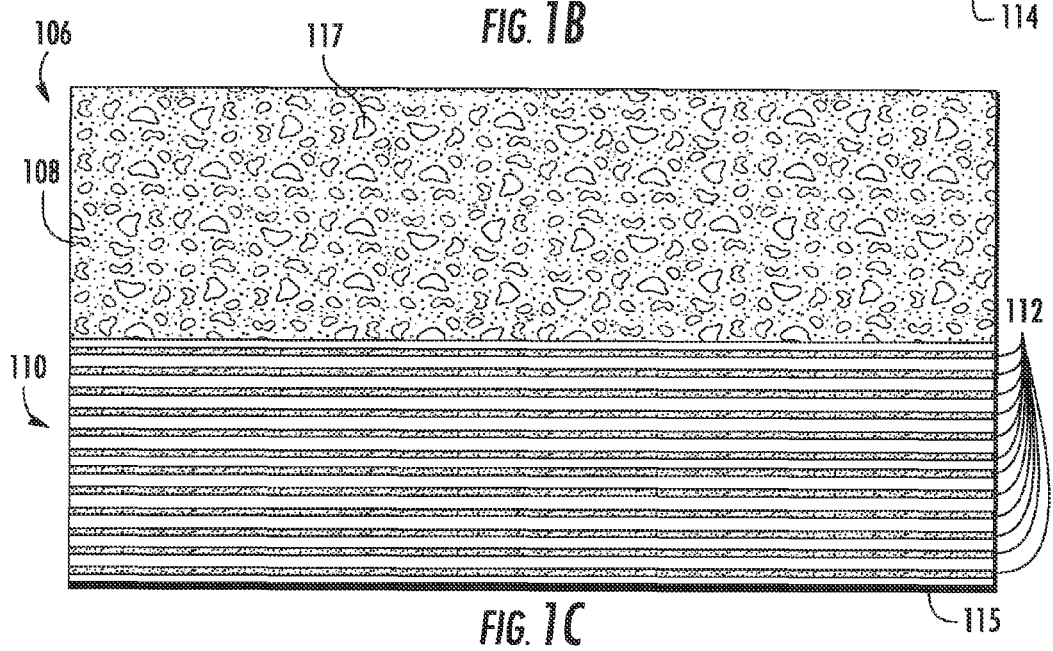

FIGS. 1B-C illustrate cross-sectional views of a ballistics resistant composite material according to another embodiment of the present invention. As illustrated in each of these figures, a composite material may comprise a first inorganic ceramic matrix of varying thickness that comprise pieces of stone with an open weave fiber glass fabric positioned at the strike face of the first inorganic ceramic matrix and a second inorganic ceramic matrix of varying thickness that comprises at least one open weave fiber glass fabric in sand and a protection layer that is coupled to the second inorganic ceramic matrix. As illustrated in FIGS. 1B-C, the composite material (105, 106) comprises a first inorganic ceramic matrix (107, 108) containing randomly dispersed, irregularly sized pieces of stone, such as granite (117), and an open weave glass fiber fabric positioned proximate an upper portion of the composite material (113). The use of "upper portion" refers only to the orientation of the composite material in the Figures. A second inorganic ceramic matrix (109, 110) contains at least one open weave fiber glass fabric (111, 112) dispersed at intervals throughout the second inorganic ceramic matrix (109, 110) which is coupled to a protection layer (114, 115). In some embodiments, when such composite materials are installed as part of a structure, the portion with the first inorganic ceramic matrix can be an exterior surface of the structure, and the portion with the second inorganic ceramic matrix can be positioned toward the interior of the structure.

Figure 2A:
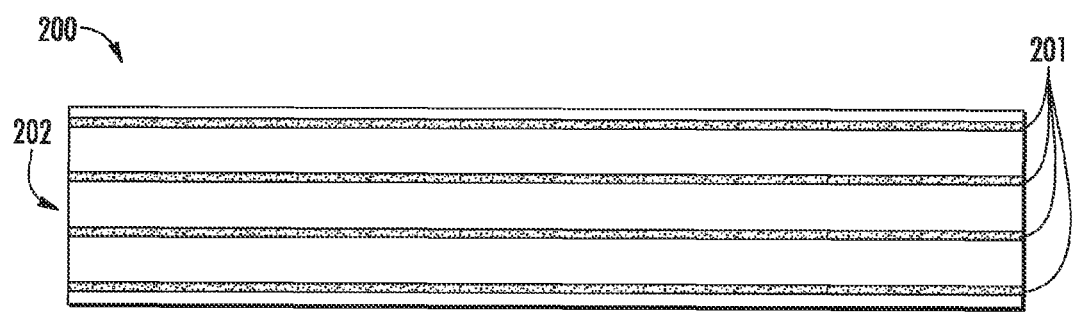
FIG. 2A-B illustrates cross-sectional views of composite materials according to one embodiment of the present invention. The sizes of the layers and distances between the layers shown in FIG. 2 are for illustrative purposes.
Figure 2B:
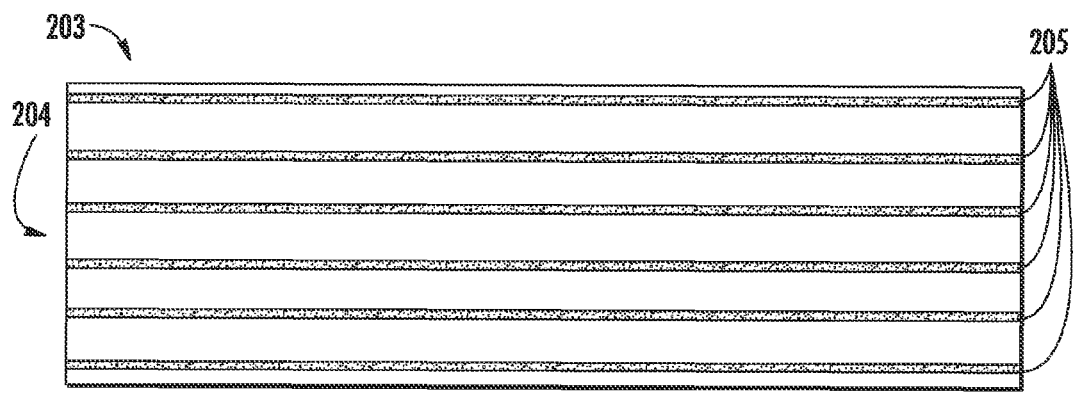

FIGS. 2A-B illustrate a cross sectional view of a blast resistant composite material of varying thickness comprising an inorganic ceramic matrix with at least one open weave fiber glass fabric dispersed within the inorganic ceramic matrix. As illustrated in FIG. 2A, the composite material (200) comprises an inorganic ceramic matrix (202) with four open weave fiber glass fabrics (201) dispersed evenly throughout at regular intervals. As illustrated in FIG. 2B, the composite material (203) comprises an inorganic ceramic matrix (204) with six open weave fiber glass fabrics (205) dispersed evenly throughout at regular intervals.

Figure 3:
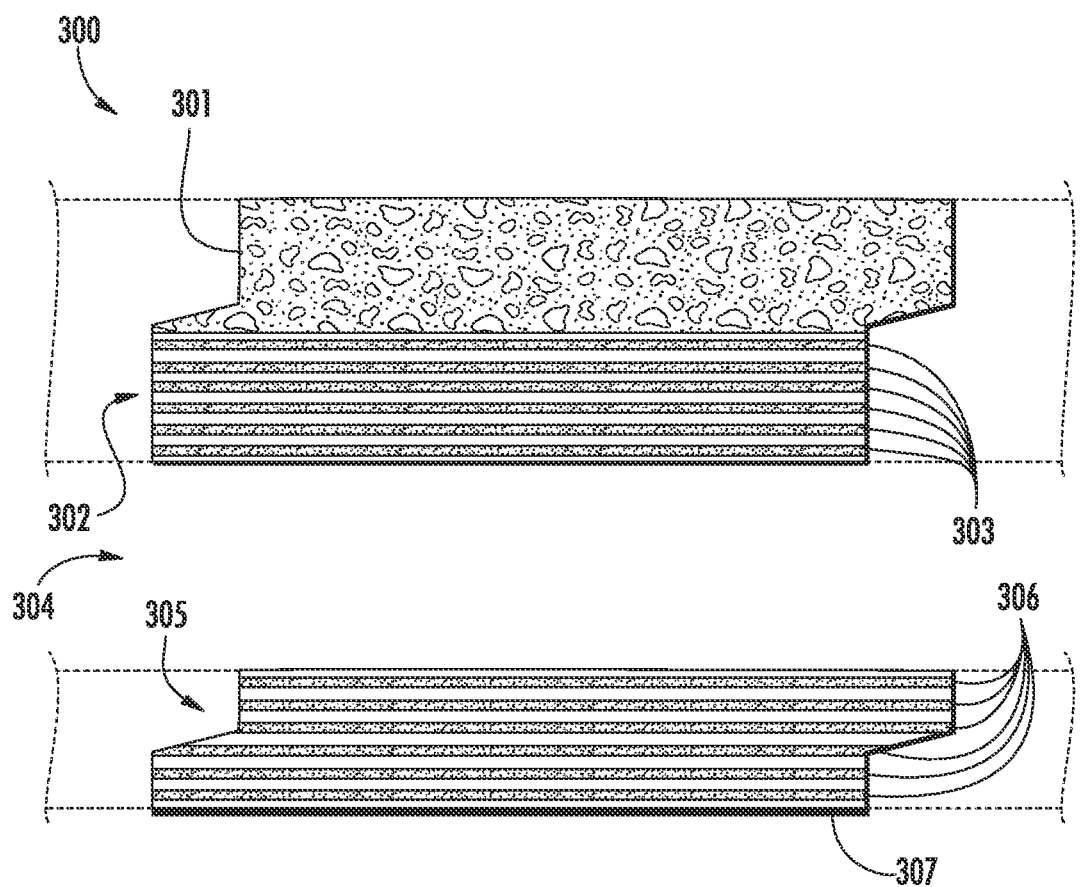
FIG. 3 illustrates a cross-sectional view of a blast protection device according to one embodiment of the present invention. The sizes of the layers and distances between the layers shown in FIG. 3 are for illustrative purposes.

FIG. 3 illustrates a cross-sectional view of a blast protection device according to one embodiment of the present invention. As illustrated in FIG. 3, the blast protection device (300) comprises a first inorganic ceramic matrix (301) containing chunks of granite fixed to a second layer of an inorganic ceramic matrix (302) with a plurality of open weave fiber glass fabrics (303) interspersed throughout. In an embodiment, the first and second layers are separated from a third inorganic ceramic matrix (305) containing a plurality of woven glass fiber fabric (306) that is fixedly attached to a layer to reduce spall (307) by a gap (304). In some embodiments, the gap is at least six inches. In some embodiments, when such composite materials are installed as part of a structure, the portion with the first inorganic ceramic matrix can be an exterior surface of the structure, and the portion with the second inorganic ceramic matrix can be positioned toward the interior air gap and the portion with the third inorganic ceramic matrix facing the interior air gap and the spall liner positioned toward the interior of the structure.

Figure 4:
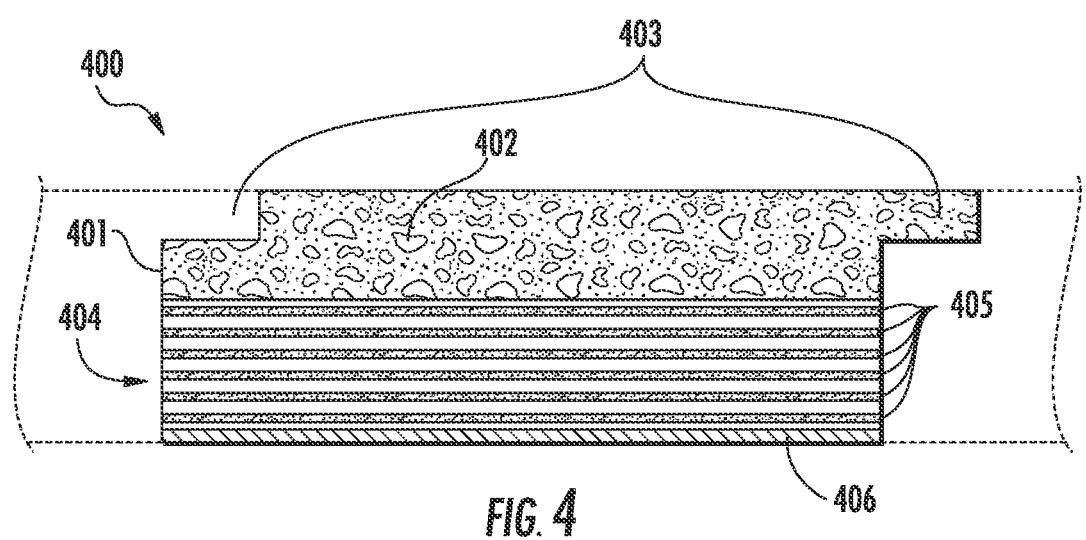
FIG. 4 illustrates a cross-sectional view of a composite material according to one embodiment of the present invention. The sizes of the layers and distances between the layers shown in FIG. 4 are for illustrative purposes.

FIG. 4 illustrates a cross sectional view of a ballistics resistant composite material (400) of the present invention that comprises a first inorganic ceramic matrix (401) containing randomly dispersed, irregularly sized pieces of stone, such as granite (402), said inorganic ceramic matrix being configured to be coupled to another composite material using a tapered lap-joint arrangement (403). The first inorganic ceramic matrix (401) is adjacent to a second inorganic ceramic matrix (404) that comprises a plurality of open weave glass fiber fabrics (405). The second inorganic ceramic matrix (404) is further coupled to a protection layer (406) to protect from delamination upon application of a blast or ballistics threat.

Figure 5:
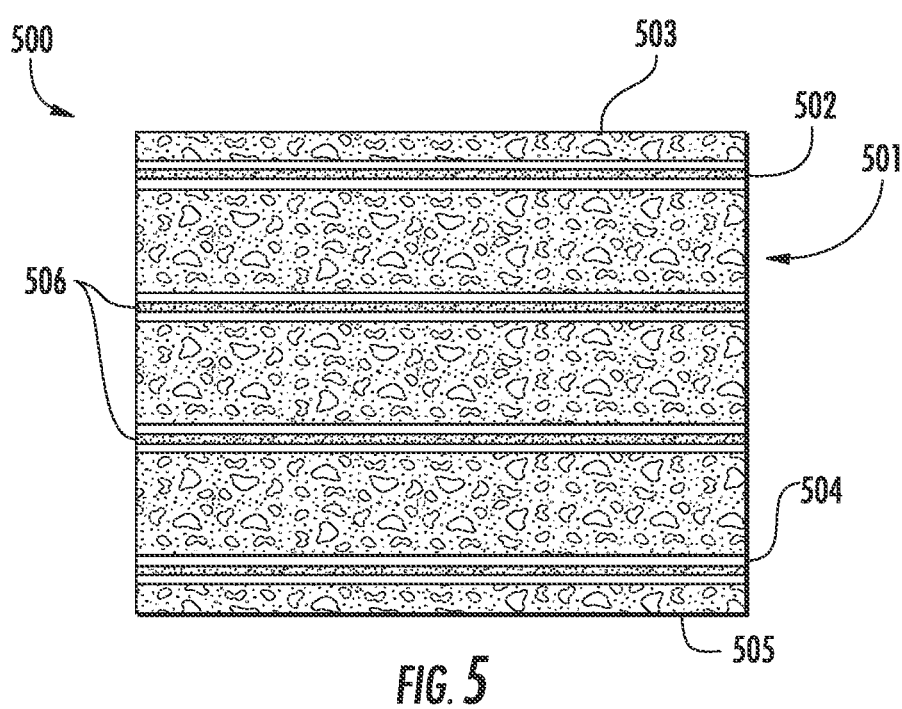
FIG. 5 illustrates a cross-sectional view of a composite material according to one embodiment of the present invention. The sizes of the layers and distances between the layers shown in FIG. 5 are for illustrative purposes.

FIG. 5 represents a cross sectional view of an embodiment of the present invention. In the embodiment shown in FIG. 5, the composite material comprises an inorganic ceramic matrix having a first surface in facing opposition to a second surface and a plurality of woven or open weave fiber glass fabrics disposed in the matrix between the first surface and the second surface. As illustrated in FIG. 5, the composite material (500) comprises a first woven or open weave glass fiber fabric (502) proximate to the first surface (503) of the inorganic ceramic matrix (501). A second woven or open weave glass fiber fabric (504) is proximate to the second surface (505) of the inorganic ceramic matrix (501). A plurality of additional woven or open weave glass fiber fabrics (506) are disposed between the first (502) and second (504) glass fiber fabrics.

Figure 6:
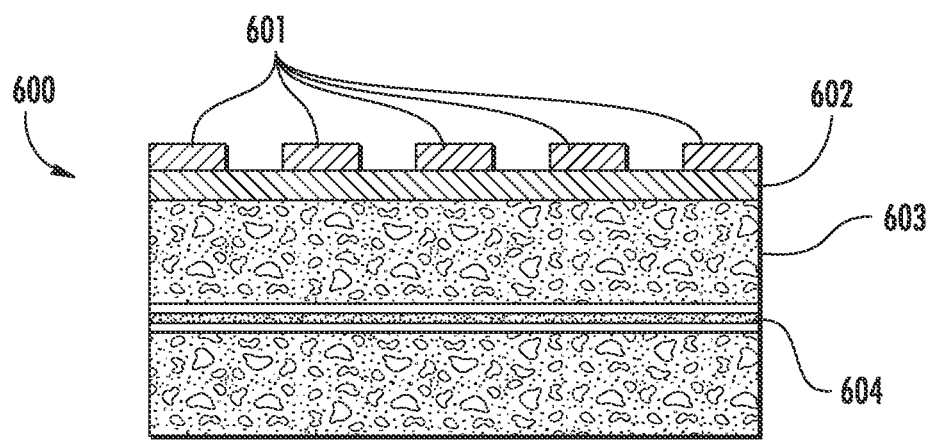
FIG. 6 illustrates a cross-sectional view of a composite material according to one embodiment of the present invention. The sizes of the layers and distances between the layers shown in FIG. 6 are for illustrative purposes.
Figure 7A:
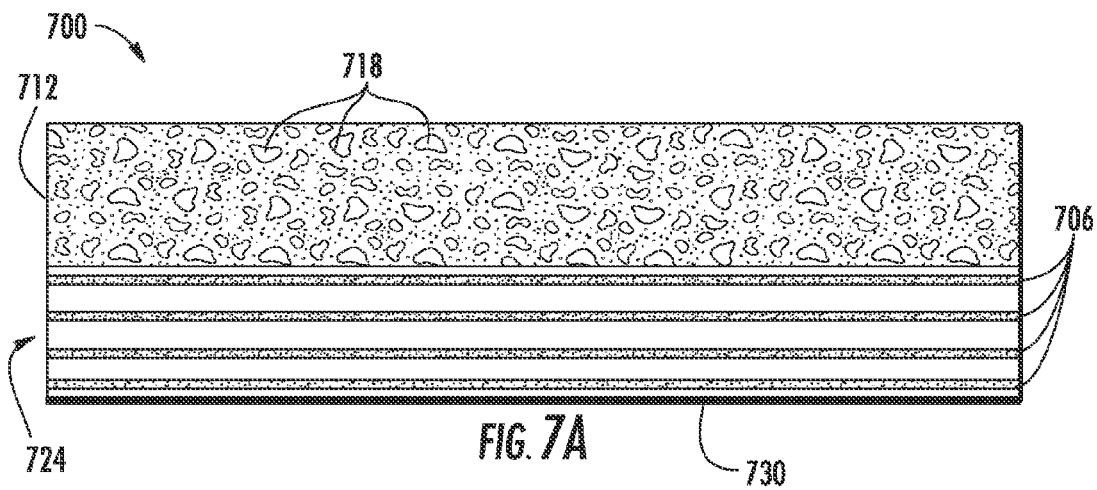
FIG. 7A-F illustrates cross-sectional views of composite materials according to one embodiment of the present invention. The sizes of the layers and distances between the layers shown in FIG. 7 are for illustrative purposes.
Figure 7B:
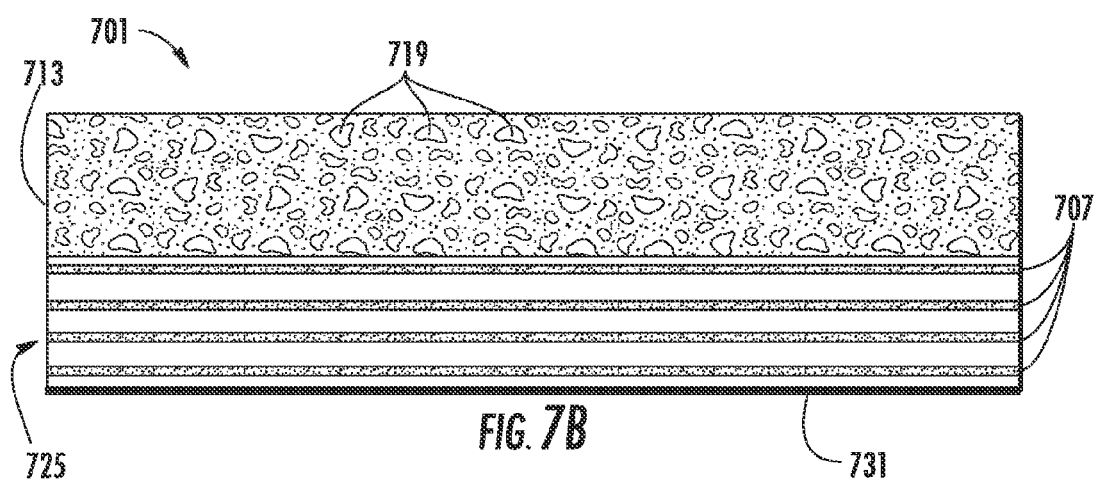
Figure 7C:
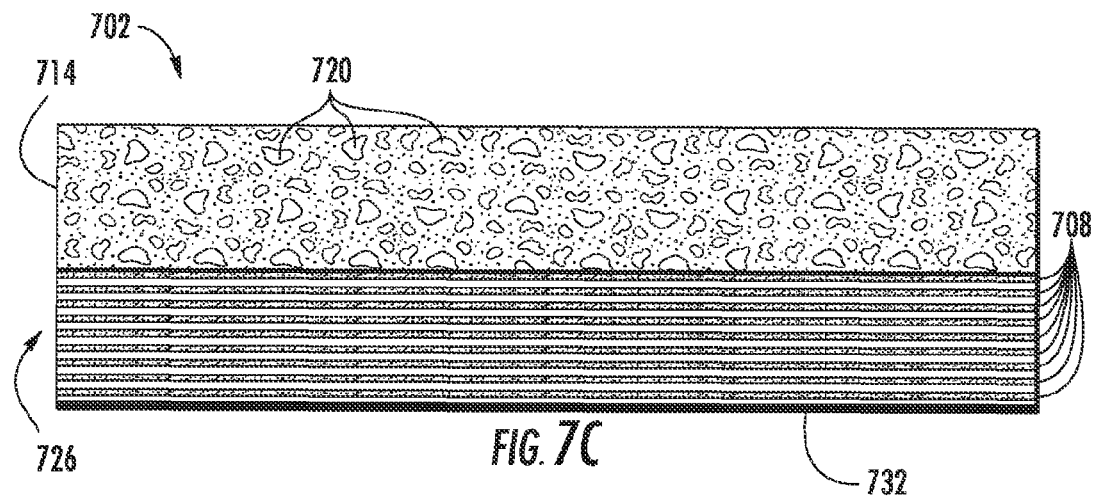
Figure 7D:
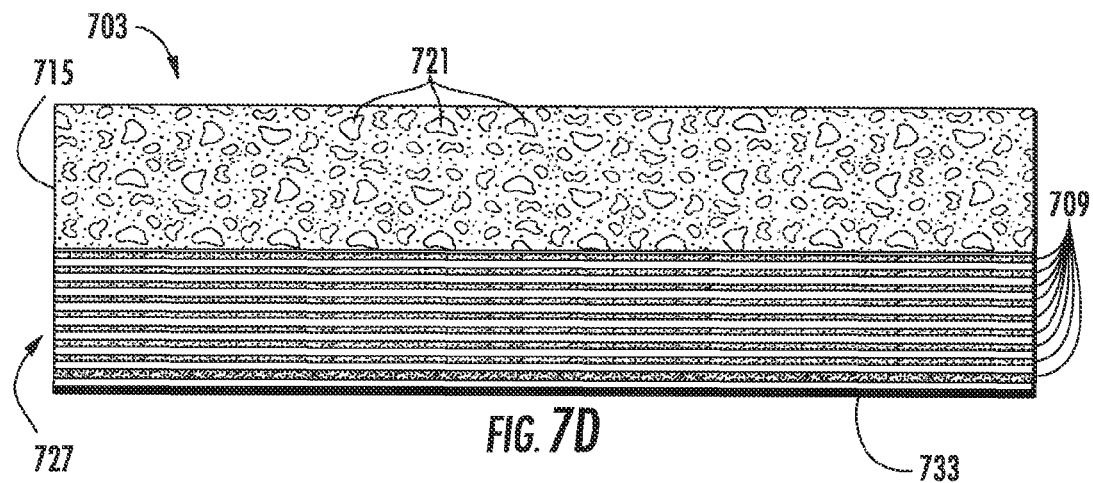
Figure 7E:
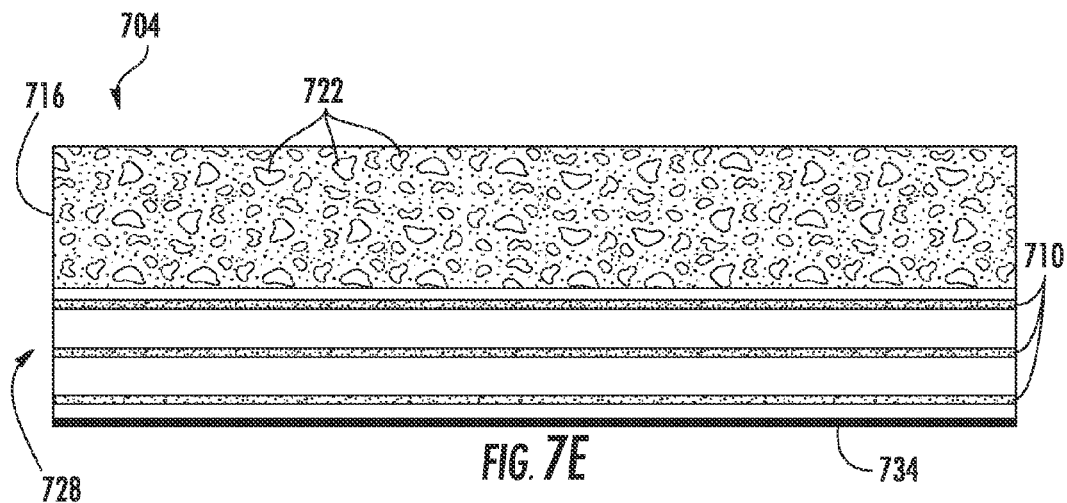
Figure 7F:
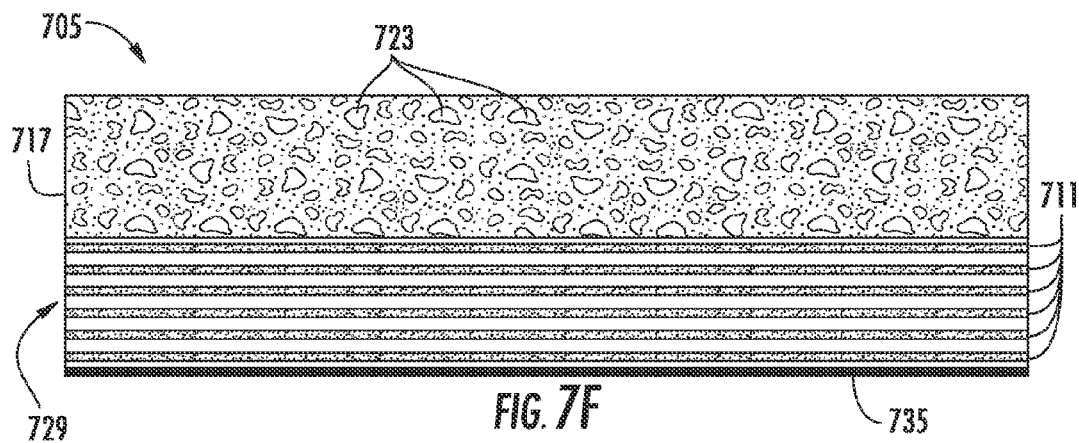

FIG. 6 represents another embodiment, a composite material (600) of the present invention comprises a plurality of studs (601), a deposition layer coupled to the plurality of studs (602) and an inorganic ceramic matrix (603) contacting the deposition layer and comprising at least one woven glass fiber reinforcement (604) disposed therein. In some embodiments, the at least one woven glass fiber reinforcement is a leno-grid woven glass fiber reinforcement.

In yet other embodiments, the woven glass fiber fabric that may be disposed within the inorganic ceramic matrix of a composite material may comprise woven glass fiber fabrics that have been lightly coated with a polymer such as an acrylic polymer.

In alternate embodiments, a woven glass fiber fabric that is disposed within the composite material comprising a plurality of studs, a deposition layer coupled to the plurality of studs and an inorganic ceramic matrix contacting the deposition may be needled. In yet other embodiments, there may be a plurality of needled woven glass fiber fabrics disposed within the inorganic ceramic matrix.

In another embodiment, the composite material may comprise a plurality of thinner or thicker woven glass fiber fabrics disposed within the inorganic ceramic matrix. In some embodiments, the composite material may comprise fewer, thicker woven glass fiber fabrics disposed within the inorganic ceramic matrix. In yet other embodiments, the composite material may comprise many thinner woven glass fiber fabrics disposed throughout the inorganic ceramic matrix.

In an embodiment, a composite material of the present invention comprising a plurality of studs, a deposition layer coupled to the plurality of studs and an inorganic ceramic matrix contacting the deposition layer and comprising at least one woven glass fiber reinforcement disposed therein may comprise a fire-resistant composite material. For example, in some embodiments, the fire-resistant composite material may provide heat resistance of up to and greater than 2000° F.

In some embodiments, a composite material of the present invention comprising a plurality of studs, a deposition layer coupled to the plurality of studs and an inorganic ceramic matrix contacting the deposition layer and comprising at least one woven glass fiber reinforcement disposed therein may comprise a ballistics resistant composite material. In some embodiments, the ballistics resistant composite material may provide protection from the penetration of projectiles fired at the composite material. In some embodiments, the composite material may provide 50% greater ballistics resistance compared to an inorganic ceramic matrix alone. In some embodiments, a composite material of the present invention may provide a total resistance to a ballistic threat as measured by MIL-STD-662F.

In some embodiments, a composite material of the present invention comprising a plurality of studs, a deposition layer coupled to the plurality of studs and an inorganic ceramic matrix contacting the deposition layer and comprising at least one woven glass fiber reinforcement disposed therein may comprise a blast resistant composite material. In some embodiments, the blast resistant composite material may provide blast resistance that exceeds the medium-level of protection standard of the UFC protection level standards. In some embodiments, the blast resistant composite material may provide blast resistance in excess of the intermediate-level of protection standard of the UFC protection level standards. For example, in some embodiments, a composite material of the present invention may exhibit no delamination or spall when a blast load of GSA medium level is applied. In other embodiments, a composite material according to the present invention may exhibit only minor cracking or delamination at a blast load of intermediate level according the protection level standards.

Also, in some embodiments, the at least one woven glass fiber reinforcement (604) can comprise any woven glass fiber reinforcement not inconsistent with the objectives of the present invention. In some embodiments, for example, the at least one woven glass fiber reinforcement (604) comprises 9 ounces per square yard E-glass leno-grid fabric.

In some embodiments, the at least one woven glass fiber reinforcement (604) comprises an approximately 14 ounces per square yard E-glass looper-grid fabric.

In some embodiments, the at least one woven glass fiber reinforcement (604) can be lightly coated with a polymer. The polymer, for example, can assist in holding the fabric (604) together, making the fabric (604) more rigid, and/or facilitating construction of a composite material. Such polymers can include thermoplastic or thermoset polymers. One example of such a polymer is an acrylic polymer.

FIGS. 7A-F illustrate cross sectional views of ballistics resistant composite materials according to embodiments of the present invention. As is illustrated in each of the figures, a composite material may comprise a plurality of either woven or open weave fiber glass fabrics, or combinations of both. As illustrated in FIGS. 7A-F, the composite material (700, 701, 702, 703, 704, 705) comprises a first inorganic ceramic matrix (712, 713, 714, 715, 716, 717) containing randomly dispersed, irregularly sized pieces of stone, such as granite (718, 719, 720, 721, 722, 723), proximate an upper portion of the composite material. The use of "upper portion" refers only to the orientation of the composite material in the Figures. A second inorganic ceramic matrix (724, 725, 726, 727, 728, 729) contains a plurality of woven or open weave glass fiber fabrics (706, 707, 708, 709, 710, 711) dispersed at regular intervals throughout the second inorganic ceramic matrix. In some embodiments, when such composite materials are installed as part of a structure, the portion with the first inorganic ceramic matrix can be an exterior surface of the structure, and the portion with the second inorganic ceramic matrix can be positioned towards the interior of the structure.

As described herein, composite materials of the present invention can comprise various fiber glass fabrics including, for example, open weave fiber glass fabrics or more tightly woven fiber glass fabrics. Examples of open weave fiber glass fabrics can include, for example, leno-grid or looper-grid woven glass fiber fabrics. Such fabrics are commercially available from Textum Weaving, Inc. of Belmont, N.C. In selecting fabrics for use in composite materials of the present invention, relevant factors to be considered include the desired flexural strength of the fabric, the desired weight per surface area of the fabric, the desired modulus of the fabric, the desired void size (e.g., size of the holes in the grid) of the fabric, and other factors. In some embodiments, for example, the desired void size (e.g., the length of one side of a void space in the grid) can generally be $1/8$ of an inch or greater. In some embodiments, the desired void size can be $3/16$ of an inch or greater. In some embodiments, the desired void size may be $1/4$ of an inch or greater. In some embodiments, the desired void size can be up to about an inch. Due to manufacturing variations, the void sizes in a particular open weave fabric may vary. An open weave fabric may have a nominal or desired void size, but the actual voids may fall within a range. For example, and without limitation, the majority of voids in a fabric having a nominal void size of $3/8$ of an inch may be between $1/8$ of an inch and $1/4$ of an inch in some embodiments.

As noted elsewhere herein, in some embodiments, such open weave fabrics can be lightly coated with a polymer (e.g., polyacrylic) to provide more rigidity to the fabric. One example of an acrylic polymer that can be used in some embodiments is FULATEX PD-0431 commercially available from H.B. Fuller Company.

Additional information about the open weave fabrics are provided throughout this application. The weight of the fabric can be selected based on a number of factors including, for example, the type of grid (leno vs. looper), the desired strength of the fabric, whether the fabric will be coated with a polymer, and other. In some embodiments, the open weave glass fiber fabric may weigh about 8 oz/yd$^2$ or more. In some embodiments, the open weave glass fiber fabric may weigh about 14 oz/yd$^2$ or more. In some embodiments, the open weave glass fiber fabric may be an about 9 oz/yd$^2$ leno-grid fabric. In other embodiments, the open weave glass fiber fabric may be an about 14 oz/yd$^2$ looper-grid fabric. In some embodiments, the looper-grid fabric can be constructed using HYBON® 2026 direct draw roving commercially available from PPG Industries, Inc.

Composite materials of the present invention can also comprise more tightly woven fiber glass fabrics. Such fabrics, for example, can be constructed by weaving fiber glass strands in a plain weave using conventional weaving techniques. The properties of the fiber glass strands can be selected based on a number of factors including, for example, the desired flexural strength of the fabric, the desired modulus of the fabric, the desired weight of the fabric, cost, and other factors. Prior to weaving, such fiber glass strands can be coated with most commercially available sizing compositions. As one example, such fabrics can be constructed using HYBON® 2006 direct draw roving (250 yield) commercially available from PPG Industries, Inc. In some embodiments, such fabrics may be constructed using HYBON® 2022 direct draw roving commercially available from PPG Industries, Inc. In some embodiments, the tightly woven fiber glass fabric may have a weight of about 15 oz/yd$^2$ or more. In some embodiments, the tightly woven fiber glass fabric may have a weight of about 18 oz/yd$^2$ or more. In some embodiments, the tightly woven fiber glass fabric may have a weight of up to about 40 oz/yd$^2$. In some embodiments, the tightly woven fiber glass fabric may have a weight of approximately 25 oz/yd$^2$. In some embodiments, the tightly woven fiber glass fabric may have a weight between about 18 oz/yd$^2$ and about 25 oz/yd$^2$. A suitable weight range of tightly woven fiber glass fabrics for use in embodiments of the present invention may be between about 18 oz/yd$^2$ and about 36 oz/yd$^2$. Additional information about such fabrics are provided throughout this application.

In another aspect, the present invention provides methods of making blast resistant and/or ballistics resistant composite materials. In one embodiment, a method of making a blast resistant and/or ballistics resistant composite material comprises providing an inorganic ceramic matrix having a first surface in facing opposition to a second surface and disposing a plurality of woven glass fiber reinforcements in the ceramic matrix. In some embodiments, a first woven glass fiber fabric is disposed proximate the first surface of the inorganic ceramic matrix, a second woven glass fiber fabric is disposed proximate the second surface of the ceramic matrix and at least one additional woven glass fiber fabric is disposed between the first and second fabrics, wherein the at least one additional fabric has a porosity lower than the first fabric and/or the second fabric. A plurality of additional woven glass fiber fabrics, in some embodiments, are disposed between the first and second fabrics.

In alternate embodiments, a method of making a composite material comprising a woven glass fiber fabric that is disposed between first and second woven fabrics disposed within a an inorganic ceramic matrix may comprise needling the woven glass fiber fabric. In yet other embodiments, the method may comprise needling a plurality of woven glass fiber fabrics disposed between the first and second woven fabrics.

In yet other embodiments, a method of making a composite material comprising a woven glass fiber fabric that is disposed between first and second woven glass fiber fabrics disposed within an inorganic ceramic matrix may comprise lightly coating the first and woven glass fiber fabrics with a polymer. The polymer, for example, can assist in holding the fabric together, making the fabric more rigid, and/or facilitating construction of a composite material of the present invention. Such polymers can include thermoplastic or thermoset polymers. One example of such a polymer is an acrylic polymer.

In some embodiments, a method of making the composite material may comprise providing a plurality of thinner or thicker woven glass fiber fabrics disposed within the inorganic ceramic matrix. In some embodiments, the method may comprise including with the composite material fewer, thicker woven glass fiber fabrics. In yet other embodiments, the method may comprise providing many thinner woven glass fiber fabrics disposed throughout the inorganic ceramic matrix.

In other embodiments, a method of making a composite material may comprise providing a first inorganic ceramic matrix containing randomly dispersed, irregularly sized pieces of stone, the first inorganic ceramic matrix can be formed from, for example, Grancrete PCW, which is commercially available from Grancrete, Inc. In some embodiments where the composite material comprises a second inorganic ceramic matrix that includes one or more glass fiber fabrics, the second inorganic ceramic matrix can be formed from, for example, two parts Grancrete PCW, which is commercially available from Grancrete, Inc., and one part sand.

In some embodiments, a method of making a composite material may comprise spraying at least one surface of the composite material may with a polymer. For example, in some embodiments, the surface of the composite material that will face the interior of a structure may be sprayed with a polymer. The polymer, in some embodiments, can limit spall or help prevent loose chunks of the composite material from flying off the composite material when the composite material is impacted (either with a blast or ballistics). In other embodiments, the polymer may be applied in a layer to the surface of the composite material with an epoxy. In some embodiments, the epoxy may be moisture cured. In some embodiments, the coating may comprise a polyurea. One example of an aliphatic polyurea that can be applied to some embodiments of composite materials is Mil-Tough™, which is commercially available from PPG Industries, Inc.

In some embodiments, a method of making a composite material of the present invention comprising an inorganic ceramic matrix having a first surface in facing opposition to a second surface and a plurality of woven glass fiber reinforcements disposed in the matrix between the first surface and the second surface may comprise providing a fire-resistant composite material. For example, the method may comprise, in some embodiments, a fire-resistant composite material that provides heat resistance of up to and greater than 2000° F.

In some embodiments, a method of making a composite material of the present invention comprising an inorganic ceramic matrix having a first surface in facing opposition to a second surface and a plurality of woven glass fiber reinforcements disposed in the matrix between the first surface and the second surface may comprise providing a ballistics resistant composite material. In some embodiments, the method may comprise a ballistics resistant composite material that protects from the penetration of projectiles fired at the composite material. In some embodiments, the composite material may provide 50% greater ballistics resistance compared to an inorganic ceramic matrix alone. In other embodiments, a composite material of the present invention may provide a total resistance to a ballistic threat as measured by MIL-STD-662F.

In some embodiments, a method of making a composite material of the present invention comprising an inorganic ceramic matrix having a first surface in facing opposition to a second surface and a plurality of woven glass fiber reinforcements disposed in the matrix between the first surface and the second surface may comprise providing a blast resistant composite material. In some embodiments, the method may comprise providing a blast resistant composite material with blast resistance that exceeds the medium-level of protection standard of the UFC protection level standards. In alternate embodiments, the method may comprise a blast resistant composite material that provides blast resistance in excess of the intermediate-level of protection standard of the UFC protection level standards. For example, in some embodiments, a composite material of the present invention may exhibit no delamination or spall when a blast load of GSA medium level is applied. In other embodiments, a composite material according to the present invention may exhibit only minor cracking or delamination at a blast load of intermediate level according the protection level standards.

In some embodiments, a method of making a blast resistant composite material comprises providing a plurality of studs, coupling a deposition layer to the plurality of studs and depositing an inorganic ceramic matrix on the deposition layer, the ceramic matrix comprising at least one woven glass fiber reinforcement disposed therein.

In some embodiments, a method of making a woven glass fiber fabric that is disposed within the composite material comprising a plurality of studs, a deposition layer coupled to the plurality of studs and an inorganic ceramic matrix contacting the deposition may comprise needling the woven glass fiber fabric. In yet other embodiments, a plurality of woven glass fiber fabrics may be disposed within the inorganic ceramic matrix.

In yet other embodiments, a method of making a woven glass fiber fabric that may be disposed within the inorganic ceramic matrix of a composite material may comprise lightly spraying woven glass fiber fabrics with an acrylic polymer.

In some embodiments, a method of making a composite material may comprise including a plurality of thinner or thicker woven glass fiber fabrics disposed within the inorganic ceramic matrix. In some embodiments, method of making a composite material may comprise including fewer, thicker woven glass fiber fabrics disposed within the inorganic ceramic matrix. In yet other embodiments, the method of making a composite material may comprise including many, thinner woven glass fiber fabrics disposed throughout the inorganic ceramic matrix.

In some embodiments, a method of making a composite material of the present invention comprising a plurality of studs, a deposition layer coupled to the plurality of studs and an inorganic ceramic matrix contacting the deposition layer and comprising at least one woven glass fiber reinforcement disposed therein may comprise providing a fire-resistant composite material. For example, in some embodiments, the method may comprise providing a fire-resistant composite material with heat resistance of up to and greater than 2000° F.

In some embodiments, the method of making a composite material of the present invention comprising a plurality of studs, a deposition layer coupled to the plurality of studs and an inorganic ceramic matrix contacting the deposition layer and comprising at least one woven glass fiber reinforcement disposed therein may comprise providing a ballistics resistant composite material. In some embodiments, the method may comprise providing a ballistics resistant composite material that protects from the penetration of projectiles fired at the composite material. In some embodiments, the composite material may provide 50% greater ballistics resistance compared to an inorganic ceramic matrix alone. In other embodiments, a composite material of the present invention may provide a total resistance to a ballistic threat as measured by MIL-STD-662F.

In some embodiments, a method of making a composite material of the present invention comprising a plurality of studs, a deposition layer coupled to the plurality of studs and an inorganic ceramic matrix contacting the deposition layer and comprising at least one woven glass fiber reinforcement disposed therein may comprise providing a blast resistant composite material. In some embodiments, the method may comprise providing a blast resistant composite material that exceeds the medium-level of protection standard of the UFC protection level standards. In some embodiments, the method may comprise providing a blast resistant composite material that provides blast resistance in excess of the intermediate-level of protection standard of the UFC protection level standards. For example, in some embodiments, a composite material of the present invention may exhibit no delamination or spall when a blast load of GSA medium level is applied. In other embodiments, a composite material according to the present invention may exhibit only minor cracking or delamination at a blast load of intermediate level according the protection level standards. In yet other embodiments, a composite material according to the present invention may withstand a blast load of high level according to the protection level standards without significant delamination.

Some embodiments of the present invention will now be illustrated in the following specific, non-limiting examples.

EXAMPLE 1

One example of an embodiment of a composite material according to the present invention is as follows. The composite material has a structure similar to that shown in FIG. 2. For ease of illustration, the labels used in FIG. 2 will be used to characterize the components of the composite material in this example, but this Example should not be viewed as limiting other embodiments of the present invention that might also have a structure similar to that shown in FIG. 2. This embodiment of a composite material 200 is approximately 1.5 inches thick. The fabrics 201 are lightweight fabrics woven from fiber glass as leno-grid fabrics and weighing approximately nine ounces per square yard. The fabrics 201 were constructed using two ends of 1200 yield direct draw fiber glass in the warp direction and one end of 550 yield direct draw fiber glass in the fill direction. The composite material 200 comprises four total fabrics 201, with one fabric positioned proximate to each surface and two fabrics positioned between the two outer fabrics within the inorganic ceramic matrix 202. These fabrics 201 were woven in a plain weave using PPG's HYBON® 2006 direct draw roving (250 yield) with 5.5 picks per inch in the warp direction and 5.3 picks per inch in the weft direction. The fabrics weigh approximately twenty-five ounces per square yard. The white areas shown in FIG. 2 represent an inorganic ceramic matrix 202 formulated from 2 parts Grancrete PCW (from Grancrete, Inc.) and 1 part sand. The composite material was formed by dry blending the Grancrete PCW and the sand with a hand held auger mixer. The Grancrete/sand mixture was then added to a continuous auger mixer with metered water mixed into the dry ingredients. A secondary mixture of further blended inorganic ceramic matrix is then pumped in via a hose into a mold or form. A first layer of leno grid fabric 201 was placed into the form and 0.5 inches of the Grancrete/sand mixture was placed on top of the fabric layer. A second layer of woven roving was then place on top of the Grancrete/sand mixture and rolled out. A second layer of the Grancrete/sand inorganic ceramic matrix was then added and another layer of roving was applied. Finally, a third layer of inorganic ceramic matrix was applied to the mold/form and a top layer of leno fabric was added to the top surface.

EXAMPLE 2

Another example of an embodiment of a composite material according to the present invention is as follows. The composite material has a structure similar to that shown in FIG. 6. For ease of illustration, the labels used in FIG. 6 will be used to characterize the components of the composite material in this example, but this Example should not be viewed as limiting other embodiments of the present invention that might also have a structure similar to that shown in FIG. 6.

The composite material 600 in this Example is a spray-coated composite material. The composite material 600 comprises a plurality of metal studs 601 with screws protruding such that the heads of the screws would penetrate into the other layers. The deposition layer 602 is a polymeric foam, such as Styrofoam and is approximately 0.5 inches thick. The composite material 600 comprises a fabric 604. The fabric 604 is a lightweight fabric woven from fiber glass as a leno-grid fabric and weighs approximately nine ounces per square yard. The fabric 604 was constructed using two ends of 1200 yield direct draw fiber glass in the warp direction and one end of 550 yield direct draw fiber glass in the fill direction. The two gray areas shown in FIG. 6 represent an inorganic ceramic matrix 603 formulated from 2 parts Grancrete PCW (from Grancrete, Inc.) and 1 part sand. The ceramic matrix 603 is approximately ⅝ of an inch thick with the fabric 604 being positioned approximately ⅜ of an inch from the outer surface of the composite material 200 and approximately ¼ of an inch from the deposition layer 602. The composite material of FIG. 6 is a 0.65 inch blast panel that may be sprayed onto a stud wall.

As was described in the preceding Example, the Grancrete PCW and sand were dry blended, mixed with water and then pumped through a hose into a spray dispensing apparatus. The spray device utilizes compressed air to disperse and transfer the inorganic ceramic matrix from the spray device to the wall. The first applications of the inorganic ceramic matrix are used to coat the deposition layer (Styrofoam). A layer of leno grid fabric was then affixed to the wet inorganic ceramic matrix using the screw heads to hang and position the fabric. Three to four more spray applications of the inorganic ceramic matrix were then placed over the fabric layer to achieve the final thickness of the wall panel.

EXAMPLE 3

Some embodiments of the present invention provide improved ballistic threat protection as measured by MIL-STD-662F. Several samples of embodiments according to the present invention were tested according to the standards set forth in MIL-STD-662F and the $V_{50}$ value as measured in ft/sec was measured. The results of this testing are presented in the table below. The $V_{50}$ value for some of the samples was unable to be calculated (as designated by N/A) because none of the fired projectiles penetrated the sample.

The panels of Example 3 were constructed by hand mixing the Grancrete PCW/sand in a tub with a large drill auger. The construction of the panels is the same as the construction detailed above in Example 1. The 1.5 inch panels each contained four layers of fiber glass fabric and three layers of inorganic ceramic matrix. The 3.5 inch panels each comprised six layers of fiber glass fabric and five layers of inorganic ceramic matrix containing two parts Grancrete PCW to one part sand. In embodiments containing both open weave and woven fabrics, the woven fabrics were disposed at the middle of the inorganic ceramic matrix and the open weave fabrics were disposed at the outer edges.

| Sample Description | Threat Level | $V_{50}$ (ft/s) |
|---|---|---|
| 1.5" thick w/regular Hybon Woven Roving ("HWR-25") and uncoated 9 oz Leno-grid | .44-Mag., 240-grain SWCGC | 1747 |
| 1.5" thick w/needled HWR-25 and coated 14 oz Looper-grid | .44-Mag., 240-grain SWCGC | 1738 |
| 3.5" thick w/regular HWR-25 and uncoated 9 oz Leno-grid | 7.62 × 39-mm, 123/grain MSC | 1965 |
| 3.5" thick w/needled HWR-25 and coated 14 oz Looper-grid | 7.62 × 39-mm, 123/grain MSC | 1992 |
| 3.5" thick w/needled HWR-25 and coated 14 oz Looper-grid | .30-06-cal., 180-grain LCSP | N/A |
| 3.5" thick w/needled HWR-25 and coated 14 oz Looper-grid | 7.62 × 51-mm, 150-grain M80 copper FMJ | N/A |
| 3.5" thick w/regular HWR-25 and uncoated 9 oz Leno-grid | .30-06-cal., 165-grain APM2 | N/A |

EXAMPLE 4

Other embodiments of the present invention provide improved ballistic threat protection as measured by MIL-STD-662F. Several samples of embodiments according to the present invention were tested according to the standards set forth in MIL-STD-662F and the $V_{50}$ value as measured in ft/sec was measured. The results of this testing are presented in the table below.

The panels were constructed as follows. The protection layer comprised a Mil-Tough "Spall Master" layer that was 0.1 inch thick and applied as a pre-cast film using an epoxy adhesive. In some embodiments, the first inorganic ceramic matrix layer may comprise granite stone (size #6 M, which is about ¾ inch in diameter) blended with Grancrete PCW at a ratio of 1:1 stone to Grancrete. In the high density stone embodiment, the first inorganic ceramic matrix comprised stone pieces that were sized smaller than the #6 M, or approximately 0.5 inches in diameter, and were mixed with Grancrete PCW at a ratio of 2:1 of stone to Grancrete. The 5.25 inch panels contained fifteen layers of looper grid fabric, all evenly spaced throughout the second inorganic ceramic matrix. The 3.5 inch panels contained seven layers of looper fabric, all evenly spaced throughout the second inorganic ceramic matrix.

| Sample Description | Threat Level | No. of Strikes | $V_{50}$ (ft/s) |
|---|---|---|---|
| 3" thick w/ standard stone construction | .30-06 = -cal., 165-grain APM2 | 9 | 2525 |
| 3" thick w/higher density stone construction (smaller size) | .30-06 = -cal., 165-grain APM2 | 9 | 2520 |
| 5.25" thick, same construction as blast wall (w/protection layer) | .30-06 = -cal., 165-grain APM2 | 9 | 3662 |
| 5.25" thick, same construction as blast wall (w/protection layer) | 50-cal., 695 grain APM2 | 5 | 2149 |
| 5.25" and 3.5" thick planks, same as blast wall (w/protection layer) | 50-cal., 695 grain APM2 | 2 | 2861 - Partial 3021 - Partial |
| 5.25" and 3.5" thick planks, same as blast wall (w/protection layer) | 20-mm, 830 grain FSP | 2 | 3316 - Partial 3676 - Partial |
| 5.25" thick panel and 3.5" thick planks, same as blast wall (w/protection layer) | 20-mm, 830 grain FSP | 2 | 4100 - Partial 4380 - Partial |

EXAMPLE 5

Some embodiments of the present invention provide improved blast and ballistic protection. Several samples of embodiments of the present invention were tested under standards for blast and ballistics protection. The results of this testing is presented in the table below. The panels were constructed using techniques similar to those described in Example 1.

| Panel Type | Thickness | Areal Density | NIJ 0108-01 | UL752 | Stanag 4569 | Euronorm EN 1063 | Blast Protection Level |
|---|---|---|---|---|---|---|---|
| Blast & Ballistic | 1.5 inch (with 4 layers of looper fabric, one fabric positioned at each outer surface and two dispersed evenly throughout) | 15 lb/ft² | Levels I, IIA II | Levels 1-3 | N/A | Levels B1, B2, B3, B4 | Protection for wall and roof structure with up to 8-foot span UFC 4-010-01, GSA low, medium and high levels |

-continued

| Panel Type | Thickness | Areal Density | NIJ 0108-01 | UL752 | Stanag 4569 | Euronorm EN 1063 | Blast Protection Level |
|---|---|---|---|---|---|---|---|
|  | 3.5 inch (with 6 layers of looper fabric, one fabric positioned at each outer surface and 4 other fabrics dispersed evenly throughout) | 35 lb/ft² | NIJ Level III | Levels 4-5 | Level 1 | Level B5, B6 | Protection for wall and roof structures with up to 14-foot span UFC 4-010-01, GSA high-level |
| Ballistic | 2 inch (panel with one inch thick first inorganic ceramic matrix comprising granite and a one inch thick second inorganic matrix comprising 6 looper fiber glass fabrics dispersed throughout) | 25 lb/ft² | Levels I, IIA, II, III-A, III | Levels 1-8 | Level 1 | Levels B1, B2, B3, B4, B5, B6 |  |
|  | 3 inch (panel with 1.5 inch first inorganic ceramic matrix comprising granite and a 1.5" thick second inorganic ceramic matrix comprising 9 looper glass fiber fabrics dispersed throughout) | 37 lb/ft² | NIJ Level III | Level 8 | Level 2 | Level B6 |  |

Desirable characteristics, which can be exhibited by embodiments of the present invention, can include, but are not limited to, the provision of composite materials having increased resistance to damage resulting from blasts or ballistics; the provision of composite materials having a lighter weight than traditional concrete reinforcements; the provision of composite materials having increased fire resistance over traditional building structures; the provision of composite materials having an increased tensile strength over traditional concrete walls; the provision of composite materials that are rapidly cured as compared to traditional concrete structures; the provision of the composite material that is environmentally superior to concrete; and/or others.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed:
1. A composite material comprising:
   an inorganic ceramic matrix comprising a first outer surface and a second outer surface opposite the first outer surface and generally parallel to the first outer surface;
   at least three evenly spaced open weave fiber glass fabrics disposed in the inorganic ceramic matrix between the first outer surface and the second outer surface, wherein the at least three evenly spaced open weave fiber glass fabrics comprise
      a first woven glass fiber fabric disposed proximate the first outer surface of the inorganic ceramic matrix, the first woven glass fabric having a void opening of at least 0.25 inches,
      a second woven glass fiber fabric disposed proximate the second outer surface of the inorganic ceramic matrix, the second woven glass fabric having a void opening of at least 0.25 inches, and
      a third glass fiber fabric disposed between the first woven glass fiber fabric and second woven glass fiber fabric, the third glass fiber fabric having a porosity lower than at least one of the first woven glass fiber fabric and second woven glass fiber fabric;
   wherein the inorganic ceramic matrix comprises a phosphate ceramic, and wherein the composite material is at least 1.5 inches thick.

2. The composite material of claim 1, further comprising a protection layer coupled to the second outer surface of the inorganic ceramic matrix.

3. The composite material of claim 2, wherein the protection layer is a spall-resistant layer.

4. The composite material of claim 2, wherein the protection layer comprises a polyurea coating.

5. The composite material of claim 2, wherein the protection layer is coupled to the second outer surface with an epoxy.

6. The composite material of claim 5, wherein the epoxy is a moisture-cured epoxy.

7. The composite material of claim 2, further comprising a woven fiber glass fabric coupled to the first outer surface of the inorganic ceramic matrix.

8. The composite material of claim 1, wherein six or more open weave fiber glass fabrics are disposed in the matrix between the first outer surface and the second outer surface.

9. The composite material of claim 1, further comprising a woven fiber glass fabric coupled to the first outer surface of the inorganic ceramic matrix.

10. The composite material of claim 1, wherein the at least three open weave fiber glass fabrics comprise a leno-grid fiber glass fabric.

11. The composite material of claim 1, wherein the at least three open weave fiber glass fabrics weigh less than about 25 ounces per square yard.

12. The composite material of claim 1, wherein the at least three open weave fiber glass fabrics are at least partially coated with a polymer.

13. The composite material of claim 1, wherein the composite material exceeds the medium-level of protection standard of the UFC protection level standards.

14. The composite material of claim 1, wherein the composite material has a $V_{50}$ value of at least 1700 ft/s as measured by MIL-STD-662F standard.

15. The composite material of claim 1, wherein the third fabric has a tight weave pattern that prevents the inorganic ceramic matrix on a first side of the third fabric to contact the inorganic ceramic matrix on a second side of the third fabric.

* * * * *